United States Patent Office 3,554,939
Patented Jan. 12, 1971

---

3,554,939
PROCESS FOR THE PREPARATION OF A POLYIMIDE FOAM
Edward Lavin, Longmeadow, and Irving Serlin, Springfield, Mass., assignors to Monsanto Company, St. Louis, Mo., a corporation of Delaware
No Drawing. Continuation-in-part of application Ser. No. 568,129, July 27, 1966. This application May 20, 1969, Ser. No. 826,290
Int. Cl. C08g 20/32; C08j 1/26
U.S. Cl. 260—2.5
21 Claims

ABSTRACT OF THE DISCLOSURE

Disclosed herein is a process for the preparation of a polyimide foam which comprises preparing a foamable polymer forming composition by intimately mixing an ester derivative of benzophenone tetracarboxylic acid and a polyamine having at least two primary amino groups per molecule to form a system having a volatile content of at least 9% and then heating this system at a temperature at which foaming occurs contemporaneously with the polymerization of the reactants.

CROSS-REFERENCE TO RELATED APPLICATION

This application is a continuation-in-part of our copending application Ser. No. 568,129, filed July 27, 1966, now abandoned.

BACKGROUND OF THE INVENTION (1) Field of the invention

This invention relates to a new process for the preparation of polyimide foams. More particularly, it relates to a process for the direct preparation of polyimide foams from monomeric polyamine components and monomeric polycarboxylic acid ester components.

(2) Description of the prior art

The unique physical properties of polyimides, e.g., organic solvent resistance, thermal stability, etc., has led to their use in such diverse applications as heat shields in aircraft and missiles, electrical insulators, gasket materials, heat resistant structural adhesives, glass laminates, etc. These polyimide materials are commonly used in the form of varnishes, films, filaments, etc. The growth of technology in the above and related areas has created a need for the preparation of a new form of polyimide resins, i.e., polyimide foams. However, the physical properties that make the polyimides so desirable in many applications has precluded the ready production of polyimide foams. U.S. Pats. 3,249,561 and 3,310,506 describe methods for the production of polyimide foams prepared from a polyamide acid solution which involves (1) selecting a polyamide-acid solution with a critical viscosity, (2) introducing bubbles into the polyamide-acid solution, (3) shaping the mass and (4) forming the polyimide. While the technology present in these patents has advanced the state of the art, it has not proceeded far enough to meet the needs of the present-day requirements. The technology of the prior art is limited to the concept of selecting a polymer with certain critical requirements, then foaming that polymer. A definite need exists for a process for the preparation of polyimide foams wherein the foam and the polymer can be prepared directly and contemporaneously from polyamine and polycarboxylic acid ester monomeric components without the necessity of preparing polyamide acid solutions of a critical viscosity.

A further need exists for a process wherein the polyimide foam may be prepared in an operation wherein the foaming and polymerizing of the monomeric components occur contemporaneously without the need for separate processing steps as are outlined in the above-mentioned patents.

Furthermore, some types of applications create a need for a material which can be polymerized and foamed in situ without the use of external means such as agitation and/or blowing agents to introduce bubbles into the composition.

Lastly, a need exists for a polyimide foam which can be produced readily over a wide density range and in diverse shapes and sizes without the need for external agitation.

SUMMARY OF THE INVENTION

The deficiencies of the prior art have been overcome in accordance with the present invention wherein there is provided a process for the preparation of a polymeric polyimide foam which is the reaction product of:

(A) partial and full ester derivatives of benzophenone tetracarboxylic acid, and
(B) a polyamine selected from the group consisting of amino compounds containing from 2 to 6 amino groups per molecule;

wherein the process comprises mixing at least one component from (A) and (B) above to form a system having a volatile content of at least 9% and heating at a temperature which is at least the minimum temperature at which foaming occurs contemporaneously with the polymerization of the benzophenone tetracarboxylic acid ester and polyamine components for a time sufficient to allow the polyimide foam to form.

DESCRIPTION OF THE PREFERRED EMBODIMENTS

The present invention lies in selecting a system comprising a benzophenone tetracarboxylic ester component and a polyamine component which are capable of condensation polymerization, which system has a critical percent volatile content such that the benzophenone tetracarboxylic acid ester and polyamine reactants will polymerize and foam contemporaneously upon being heated to a critical temperature which varies with the particular reactant system used as well as with the volatile content of that system.

The percent volatile content of the system is measured by the weight loss occurring in a 1–5 gram sample of the system which is heated at 300° C. for 10 minutes. This value is calculated as follows:

$$\frac{\text{Original sample weight} - \text{weight of sample after heating}}{\text{Original sample weight}} \times 100\% = \text{percent volatiles}$$

The percent volatiles in systems such as described in this invention is due primarily to any solvent used to dissolve the monomeric reactants and to the alcohol moiety of the ester and water evolved during the condensation polymerization which occurs upon heating. As is readily apparent to those skilled in the art, the volatile content of the system, due solely to the evolution of alcohol moiety of the ester and to water of condensation, will decrease as polymerization occurs. Once the volatile content of the system, which is due to this evolution of alcohol moiety of the ester and water of condensation, falls below the critical percent volatile content, which critical limit varies from system to system, no foaming will take place regardless of the temperature at which the system is heated.

The minimum critical temperature necessary to cause foam formation is defined as that temperature at which the polymerization reaction and the foaming process occur contemporaneously. Although these two reactions usually proceed together, it is not necessary that they start together or end together or even be of the same duration in time. This minimum critical temperature may be further defined as that temperature at which the benzophenone tetracarboxylic acid ester component and the polyamine component, or salts formed from these reactants, will polymerize while contemporaneously foaming, to give a product that is a polymer foam. This concept is radically different from the usual method of first polymerizing an then adding foaming agents to the polymer to form a foamed polymer.

The temperatures necessary to produce the polyimide foams of this invention depend upon the particular reactants used as well as upon such factors as carrying out the reaction under atmospheric, super-atmospheric or sub-atmospheric conditions as well as upon the use of catalysts, blowing agents, surface active agents, nucleating agents, etc., as are discussed below. In general, the co-reactants must be heated at that temperature which is at least their minimum critical temperature in order to polymerize the reactants while contemporaneously forming the foam. The heating time will likewise vary with the reactants as well as with the above mentioned conditions. In general, the polyimide polymer structure will form more rapidly at elevated temperatures, i.e., temperatures about one hundred degrees or more above the minimum critical temperature of the system.

Conversely, the selection of temperature conditions which is at or slightly above the minimum reaction temperature of the benzophenone tetracarboxylic acid ester/ polyamine components or salts formed from these components will require a longer heating time in order to form the polyimide foam structure. It should be noted in regard to the case of using temperatures at or slightly above the minimum critical temperature of the system, that the foaming of the mass will usually occur at the start of the polymerization reaction, but will end prior to the completion of the polyimide polymer structure.

In determining a specific volatile content and a specific temperature necessary for preparing foams in the practice of this invention several factors must be considered. The minimum permissible percent volatile content and critical temperature will depend on the particular benzophenone tetracarboxylic ester and polyamide components chosen, the particular solvent system (in the event that a solvent based system is used instead of an intimate mixture of dry reactants), the type of foam desired, etc.

Inherent in the concept of this invention is heating the reactants until polyimide foam formation occurs. The time required for polyimide foam formation to occur will vary with the particular system used. Generally, the polyimide foam forming process takes place within 30 minutes as is evidenced by the working examples.

Once the polyimide foam is formed, it may be post-cured at temperatures up to 372° C. for as long as 24 hours with no substantial change in the properties of the foam.

The following examples are set forth in illustration of the invention and should not be construed as limitations thereof. All parts and percentages given are by weight, unless otherwise indicated.

EXAMPLE I

This example is set forth to illustrate the preparation of a molecular dispersion of the diethyl ester of benzophenone tetracarboxylic acid and m-phenylene diamine which may be converted to a polyimide foam. A solution of the diethyl ester of benzophenone tetracarboxylic dianhydride (BTDA-diEt) is prepared by refluxing a suspension of 468 g. of benzophenone tetracarboxylic acid dianhydride (BTDA) in 820 ml. of 2B ethanol for 1 hour. The resulting solution is cooled to 50° C. and 156.4 grams of m-phenylene diamine (m-PDA) is added and the solution is stirred for ½ hour. Fifty grams of this 60% solids solution is placed in a one-liter round bottom flask attached to a Rinco Evaporator, and the solution is film evaporated under water pump vacuum in ½ hour at 50° C. The product, which is a friable molecular dispersion of BTDA-diEt and m-PDA monomeric components, is easily removed from the flask as a brown powder, having a volatile content of 24%, which powder is free flowing below 100° C.; cakes between 100–105° C. and melts at 105–115° C. to form a dark gummy liquid.

This foamable powder is used to prepare polyimide foams as is illustrated in the following Examples II–III.

EXAMPLE II

This example illustrates the preparation of a tough spongy resilient polyimide foam from the foamable powdery monomeric components prepared in Example I. 25 grams of the foamable powder prepared in Example I are sprinkled in an aluminum tray and placed in an oven preheated to 300° C. Within 3 minutes, a loaf shaped tough, yellow, spongy resilient polymer foam is formed. This polymer foam has a bulk density of 0.6 lb./cu. ft. and does not burn when held in the flame of a Bunsen burner.

EXAMPLE III

This example is set forth to illustrate the production of in situ polymer foam insulation without the use of external agitation, wherein the polymer foam conforms to the shape of the container.

Example II is repeated here except that the foamable powdery molecular dispersion of the BTDA-diEt and m-PDA monomeric components prepared in Example I is placed in a doughnut shaped container fitted with a perforated lid. The same type of tough spongy resilient polymer foam is formed as in Example II except that the polymer foam has taken the shape of the doughnut shaped container.

EXAMPLE IV

This example is set forth to illustrate the ablative properties of the polymer foam prepared in Example II. A piece of foam 0.8 inch thick is supported over the flame of a Bunsen burner. After 15 minutes, the bottom of the foam in contact with the flame is glowing bright red and the foam thickness is reduced to about 0.6 inch. However, the top of the foam is only warm to the touch which demonstrates the ablative or heat shield capabilities of the foam.

A critical feature of this invention is the percent volatiles content of the mixture of the partial and full ester derivatives of benzophenone tetracarboxylic acids and polyamine reactants. This criticality as well as the criticality of reaction temperature in foam formation is illustrated in the following Table One, wherein the data are tabulated for the monomeric system of Example I. The 60% solids system of the diethyl ester of benzophenone tetracarboxylic acid and m-phenylene diamine (BTDA-diEt/m-PDA) in 2B ethanol prepared in Example I is evaporated down in a Rinco evaporator according to the procedure of Example I. Samples of either the solution or the dry solids are taken at different intervals, the percent volatiles are measured, and then one gram aliquots of these samples are placed in aluminum weighing dishes and heated for 10 minutes at the temperatures indicated. The numerical values in parentheses are approximate densities in lbs./cu. ft. for the foams indicated.

TABLE 1.—ILLUSTRATION OF PERCENT VOLATILES AND REACTION TEMPERATURE ON FOAM FORMATION USING A BTDA-diEt/m-PDA ETHANOL SYSTEM

| Percent volatiles | Temperature C. | | | | |
|---|---|---|---|---|---|
| | 100 | 135 | 200 | 250 | 300 |
| 52 | Film | Film | Vitreous coarse foam (1.2) | Vitreous coarse foam (0.8) | Vitreous coarse rigid foam (1.1). |
| 31 | do | do | do | Vitreous coarse foam (1.5) | Vitreous coarse rigid foam (1.9). |
| 28 | do | do | do | Spongy foam | Spongy foam. |
| 24 | Powder | Friable foam | Fine, friable foam (1.1) | Uniform spongy foam (0.9) | Tough resilient foam (0.6). |
| 22 | do | do | Fine, friable foam (1.3) | Uniform spongy foam (0.8) | Tough resilient foam (0.7). |
| 20 | do | Powder | Compact foam (1.9) | Compact foam (1.3) | Spongy foam (1.2). |
| 19 | do | do | Dense compact foam (9.5) | Compact foam (1.9) | Do. |
| 16 | do | do | Powder | Dense compact foam (9.6) | Dense compact foam (916). |
| 12 | do | do | do | Powder | Powder. |

The data in Table 1 illustrating the BTDA-diEt/m-PDA/ethanol system indicates that at temperatures of 100° C. and at a volatile content of 12% or lower, no foaming takes place. In the cases using temperatures of 100° C. or less, it is presumed that the low rate of condensation polymerization if any results in a corresponding low rate of evolution of volatiles which is insufficient to cause foaming.

In the situation of high temperatures (300° C.) and low volatiles (12%) it appears that while the temperature is high enough to cause condensation polymerization there is not sufficient volatiles remaining in the system to cause foaming of the polymer.

Thus, in the BTDA-diEt/m-PDA/ethanol system the preferred foams are obtained by evaporating the system to a volatile content of from 16 to 31%, and heating at a temperature of at least 200° C. in order to form the foam. The especially preferred low density foams are obtained by evaporating the system to a volatile content of from 19 to 29% and heating to at least 250° C. to form the foam. In regard to the data in Table One, it should be noted that volatile contents of about 25% and below are due to the evolution of the alcohol moiety of the ester and to the water of condensation which occurs upon polymerization and not to the 2B ethanol solvent used.

It should be noted that as long as the percent volatiles of the system is within the preferred range, the material may be heated further at suitable temperatures to form a tough resilient foam as is illustrated by the following Example V.

EXAMPLE V

The foamable powder of Example I, having a percent volatile content of 24% is heated at 200° C. for 1 minute to form a brittle red foam having a volatiles content of 21%. This brittle red foam is then heated at 300° C. for 10 minutes to form a tough yellow resilient foam comparable to that prepared in Example II.

EXAMPLE VI

This example further illustrates the use of controlled heating to regulate the foam density. The foamable powder of Example I is heated at 180° C. for 2 minutes and cooled rapidly to room temperature so as to cause foam collapse. The collapsed foam which has a volatiles content of 18% is then heated at 300° C. for 5 minutes to form a compact foam having a bulk density of about 5 lbs./cu. ft.

EXAMPLE VII

Example I is repeated here except using an equimolar amount of 4,4'-oxydianiline (ODA) as the polyamine component. The resulting powder which has a volatile content of 27% is then foamed according to the procedure of Example II to give a foam which is comparable to the foam prepared in Example II.

EXAMPLE VIII

Example I is repeated here except using a 10% molar excess of methylene dianiline as the polyamine component. The resulting powder which has a volatile content of 22% is then foamed according to the procedure of Example II to give a foam which is comparable to the foam prepared in Example II.

EXAMPLE IX

This example illustrates the preparation of foams from the BTDA-diEt/m-PDA powdery molecular dispersion prepared in Example I using a tertiary amine to control foam density. 9.1 grams of the foamable powder of Example I having a volatile content of 24% is mixed thoroughly with 4% by weight of pyridine. The mixture is heated at 225° C. for 10 minutes to produce a tough, spongy resilient fine-textured polyimide foam having a bulk density of about 2 lb./cu. ft. This foam is similar to that foam prepared in Example II except for the higher density, and finer structure in spite of the lower reaction temperature.

The following Example X illustrates the use of the dimethyl ester of benzophenone tetracarboxylic acid and meta-phenylene diamine in a methanol solvent in the preparation of the foams of this invention.

EXAMPLE X

The general procedure of Example I is repeated here except that anhydrous methanol is used in place of 2B ethanol to form the dimethyl ester of benzophenone tetracarboxylic acid, and anhydrous methanol is used as the solvent for the reactants. The resulting solution is evaporated down to a volatile content of 13%. During the evaporation procedure, samples of the reactant mixtures are taken at various times, wherein the percent volatiles content of these samples is measured and then 1.0 gram samples of either the solution or the dry solids is heated at various temperatures for 10 minutes to determine the foaming characteristics of this system.

The results are tabulated in the following Table Two, wherein the values in parentheses are approximate densities in lbs./cu. ft. for the foams indicated.

TABLE 2.—ILLUSTRATION OF EFFECT OF PERCENT VOLATILES AND REACTION TEMPERATURE ON FOAM FORMATION USING BTDA-diMe/m-PDA METHANOL SYSTEM

| | Temperature ° C. | | | | |
|---|---|---|---|---|---|
| | 100 | 135 | 200 | 250 | 300 |
| Percent volatiles: | | | | | |
| 52.4 | [1] 2.4 | [1] .8 | [1] .8 | [1] .7 | [1] .6 |
| 23 | [2] | [2] | [1] 3.0 | [1] 1.9 | [3] 1.7 |
| 20 | [2] | [2] | [1] 4.9 | [1] 3.6 | [3] 3.9 |
| 13 | [2] | [2] | [2] | [2] | [2] |

[1] Vitreous friable foam.
[2] Powder.
[3] Spongy foam.

The data in Table 2 indicates that in this system no foam is formed when the percent volatiles are 13% or less regardless of the temperature to which the reactants are heated. However, at 52.4% volatiles, a foam structure is obtained at temperatures as low as 100° C. which indicates that this volatiles content is sufficient to cause foam formation in this system.

The preferred foams prepared from this system are obtained using temperatures in excess of 250° C. and reactants in the 15 to 25% volatiles range. Volatile content in this system at levels of about 20.2% and below are due to the evolution of the alcohol moiety of the ester and to the water of condensation formed during polymerization.

EXAMPLE XI

This example is set forth to illustrate the use of the dibutyl ester of benzophenone tetracarboxylic acid (BTDA-diBu) and m-phenylene diamine (m-PDA) in a butanol solvent in the preparation of foams in the practice of this invention.

The general procedure of Example I is repeated here except that anhydrous n-butanol is used in place of 2B ethanol to form the dibutyl ester of benzophenone tetracarboxylic acid, and anhydrous n-butanol is used as the solvent for the reactants. The resulting solution is evaporated down to a volatile content of 15%. During the evaporation procedure, samples of the reactant mixtures are taken at various times, wherein the percent volatiles content of these samples is measured and then 1.0-gram samples of either the solution or the dry solids is heated at the temperatures indicated for ten minutes to determine the foaming characteristics of this system.

The results are tabulated in the following Table 3, wherein the values in parentheses are the approximate densities in lbs./cu. ft. for those foams indiciated.

TABLE 3.—ILLUSTRATION OF EFFECT OF PERCENT VOLATILES AND REACTION TEMPERATURE ON FOAM FORMATION USING BTDA-diBu/m-PDA/BUTANOL SYSTEM

| | Temperature ° C. | | | | |
|---|---|---|---|---|---|
| | 100 | 135 | 200 | 250 | 300 |
| Percent volatiles: | | | | | |
| 57.2 | (¹) | (¹) | ² <.8 | ² <.9 | ³ <.7 |
| 31 | (¹) | (¹) | ² <.9 | ² <.9 | ³ <.8 |
| 29 | (¹) | (¹) | ² 0.7 | ² 0.9 | ³ 1.2 |
| 27 | (⁴) | (¹) | ² 1.0 | ² .7 | ³ .9 |
| 26 | (⁴) | (¹) | ² 1.4 | ² .5 | ³ .9 |
| 22 | (⁴) | (⁴) | (⁴) | (⁴) | (⁴) |
| 15 | (⁴) | (⁴) | (⁴) | (⁴) | (⁴) |

¹ Film.
² Vitreous friable foam.
³ Vitreous brittle foam.
⁴ Powder.

The data in Table 3 indicates that no foam formation takes place when the volatiles content of this system is 22% or less, regardless of the temperature used. The results in the foregoing tables further illustrate that the formation of foam at a given temperature is a function of the ester used as well as the particular volatile content of the system. In the systems described in Table Three, the volatile contents of about 31.8% and below, are due primarily to the evolution of the alcohol moiety of the ester and the water of condensation rather than to the butanol solvent used.

EXAMPLE XII

This example illustrates the stability of the polyimide foams of this invention. The foam of Example II is placed in a 300° C. oven for 8 hours. Upon cooling to room temperature, the foam is examined and found to be similar to an unheated control foam, except for slight shrinkage (ca. 5%) and more toughness in the post-heated foam.

The following examples tabulated in Table 4 below illustrate the variations in starting materials that one may use in the preparation of polyimide foam in the practice of this invention. In each case, an intimate mixture of reactants is obtained by evaporating a solution of the reactants to volatile contents ranging from 9% to 60% using vacuum conditions wherever necessary. The reactants are then placed in aluminum trays and heated at temperatures up to 350° C. for up to 30 minutes to give polyimide foams of varying density and resiliency.

TABLE 4

| Example | Ester | Weight in grams | Poly-amine | Weight in grams | Percent volatiles |
|---|---|---|---|---|---|
| XIII | Dimethyl ester of BTA | 4.00 | PAB | 3.50 | 9 |
| XIV | Tetrabutyl ester of BTA | 5.82 | m-PDA | 1.08 | 60 |
| XV | Tetramethyl ester of BTA | 4.14 | m-PDA | 1.08 | 18 |
| XVI | Tetraethyl ester of BTA | 4.70 | m-PDA | 1.08 | 32 |
| XVII | Dimethyl ester of BTA | 3.86 | MEM | 1.8 | 19 |
| XVIII | I-methyl ester of BTA | 3.72 | BIM | 1.28 | 17 |
| XIX | I-ethyl ester of BTA | 3.86 | m-PDA | 1.08 | 20 |
| XX | I-butyl ester of BTA | 4.14 | PAB | 3.45 | 14 |

LEGEND:
BIM = bis(3-methyl-4,6-diaminophenyl)-methane.
BTA = benzophenone tetracarboxylic acid.
MEM = 3-methyl-4,6,4'-triaminodiphenylmethane.
m-PDA = meta-phenylene diamine.
PAB = para-phenylene-bis-2(5-amino-1,3-benzoxazole).

The examples in Table 4 also serve to illustrate the use of partial and full esters of benzophenone tetracarboxylic acid, containing from 1 to 4 ester groups per molecule, in the preparation of polyimide foam. Example XVII illustrates the use of a triamino compound while Example XVIII illustrates the use of a tetraamino compound in the preparation of polyimide foam. Example XIII illustrates that a foam structure is obtained at a volatile content of 9%. This particular system (Example XIII) has a volatile content of about 12% due solely to the evolution of the alcohol moiety and water of condensation.

The preferred solvents which may optionally be used in this invention are any liquids which are solvents for the ester and amine components and which have a boiling point below the minimum critical temperature necessary to polymerize the reactants and form the foam. The use of solvents with boiling points above the reaction temperature of the co-reactants will necessitate the use of vacuum conditions in evaporating the solvent to obtain a foamable powder in order to avoid premature polymerization of the reactants with a subsequent loss in the volatile content of the reactant system. When these higher boiling solvents are used, the system is preferably evaporated down to a volatile content not more than 10% above and preferably not more than 5% above that volatile content which is due solely to the evolution of the alcohol moiety of the ester and to the water of condensation.

The following Example XXI which is a repetition of Example 6 of U.S. Pat. 3,190,856, is set forth to illustrate the prior art teaching of dissolving the reactants in a high boiling solvent and then heating them to form a film. This example gives no suggestion, however remote that it is possible to form a foam from these reactants. Further, this example shows the necessity for selecting a solvent which has a boiling point below the critical temperature at which polymerization and foaming takes place contemporaneously if foam formation is to take place. This example also points out that when the monomeric reactants are dissolved in solvents having a boiling point above that temperature at which polymerization and foaming of the system occurs contemporaneously, it is necessary to evaporate the solvent off using vacuum conditions and temperatures below the critical temperature in order to subsequently foam the reactants.

EXAMPLE XXI

Benzophenone tetracarboxylic dianhydride (BTDA) 23.8 g. was refluxed for 15 hours in 61.2 g. anhydrous ethyl alcohol. The resulting solution is evaporated to dryness, leaving a soft, tacky mass of the diethyl ester of the tetracarboxylic acid. An amount of 7.52 g. of compound is dissolved in 23.4 g. cresol and the resulting solution is mixed with another solution of 3.64 g. 4,4'-oxydianiline in 14.6 g. cresol. This solution of monomers is immediately applied to a substrate, in this case a sheet of cold rolled steel, and the coated steel is baked for one hour at 300° C. in an oven. A clear light yellow, tough abrasion resistant, heat resistant and flexible film is produced. This lack of foam structure is attributed to the fact that the temperature required for polymerization of the reactants is well below the boiling point of the cresol. Thus, the polymer formation takes place without contemporaneous foam formation because the alcohol and water evolved during polymerization dissolve in the cresol and are not available to foam the reactant/polymer system.

The choice of a solvent will be further dictated by the solubility of the reactants used. In general, one may use alcohols such as methanol, ethanol, propanol, butanol, pentanol, etc. and derivatives and isomers thereof; ketones, such as acetone, methyl ethyl ketone, methyl isobutyl ketone; water and aqueous ammonia; dioxane and the other solvents which are so well known to those skilled in the polyimide art that they need no further teaching here.

An intimate mixture of reactants may also be obtained by mechanical blending of the benzophenone tetracarboxylic ester and polyamine components using means such as ball mills, mortar and pestle, high impact grinding, ultrasonic grinding, etc. The evaporation of solutions of reactants is preferred over mechanical grinding of reactants using mortar and pestle, ball mills, etc., because the evaporation technique gives molecular dispersions of reactants which are more uniform in composition than those achieved by mechanical grinding. However, if desired, the residue of the evaporation process may be ground to achieve finer particle size.

EXAMPLE XXII

This example illustrates the use of an intimate mixture of reactants that is obtained by mechanical blending rather than by the solvent evaporation technique of the earlier examples.

Equimolar amounts of the diethyl ester of benzophenone tetracarboxylic acid and m-phenylene diamine are ground using a mortar and pestle to form an intimate mixture of reactants having a volatile content of 24.8%. One gram of this mixture is heated for three minutes at 300° C. to produce a tough resilient foam which is comparable to that produced in Example II except for slight irregularities in the internal foam structure which are attributed to a nonuniform distribution of reactants.

The properties of the foams of this invention that are prepared from dry reactants, e.g., density, texture, etc., may be altered by moistening the reactants with liquids such as alcohols, water, esters, ketones, pyrrolidones, surfactants, antifoaming agents, etc. These materials are used merely to wet the powders and do not necessarily have to be solvents for the materials.

Foams prepared by heating the reactants at temperatures in excess of 200° C. for up to 30 minutes or at lower temperatures for longer periods of time are characterized by a polyimide structure as evidenced by insolubility in cold basic reagents, such as N-methyl pyrrolidone, which are good solvents for the reactants and as well as for polyamic acids. Infrared absorption data on the foam structure also indicates a polyimide structure as indicated by the bands at 5.64, 5.89 and 13.85 microns. Foams prepared using esters of benzophenone tetracarboxylic are further characterized by a ketimine structure as is evidenced by I.R. absorption bands at 6.18 microns. Foams prepared from monomeric reactants characterized by having two benzoid structures joined by amide linkages as is described below will contain both imide and amide structures in the same polymeric foam.

If desired, the foams prepared in accordance with the practice of this invention may be post-cured at elevated temperatures, e.g., 200–300° C. to insure the elimination of all volatiles and in some instances to toughen and pre-shrink the foam before its final end use.

The starting materials for forming the products of the present invention are (1) ester derivatives of benzophenone tetracarboxylic acid compounds and aromatic polyamines containing at least two primary amino groups per molecule.

The expression aromatic polyamine is used herein to include (1) those polyamines containing at least one aromatic carbocyclic ring of at least six carbons which is characterized by benzenoid unsaturation; (2) those polyamines containing at least one heterocyclic ring of from 5 to 7 atoms and (3) those polyamines containing mixtures of aromatic carbocyclic rings and heterocyclic rings.

The polyamines include diamines characterized by the formula: $H_2N-R-NH_2$ wherein R is a divalent radical selected from the following groups: aromatic carbocyclic radicals, heterocyclic radicals, combinations of aromatic and heterocyclic radicals and bridged radicals wherein aromatic carbocyclic and/or heterocyclic groups are bridged by a divalent linking moiety selected from the group consisting of alkylene of from 1 to 6 carbon atoms, oxygen, arylene of from 6 to 16 carbon atoms, —NH—, sulfur, sulfonyl, carbonyl, phosphorous, phosphonyl, silicon and derivatives thereof. The preferred R groups in the diamines are those aromatic groups containing at least 6 carbon atoms and characterized by benzenoid unsaturation. Such R groups include para-phenylene, meta-phenylene, bisphenyl radicals, fused ring systems having 2–4 aromatic nuclei, wherein the two amine groups would be located on separate aromatic nuclei and bridged organic radicals of the general formula:

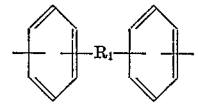

wherein $R_1$ is a divalent linking radical selected from the group consisting of alkylene radicals of from 1–6 carbon atoms, arylene radicals of from 6–16 carbon atoms, oxygen, —NH—, carbonyl, sulfur, sulfonyl, phosphorous, phosphonyl, silicon and derivatives thereof. The foregoing structure also contemplates having the $R_1$ group connected to the aromatic nuclei by ester, amide and thioester linkages.

Among the diamines which are suitable for use in the present invention are: meta-phenyl diamine; para-phenylene diamine; 4,4'-diamino-diphenyl propane; 4,4'-diamino-diphenyl methane; bizidine; 4,4'-diamino-diphenyl sulfide; 4,4'-diamino-diphenyl sulfone; 3,3'-diamino-diphenyl sulfone; 4,4'-diamino-diphenyl ether; 2,6-diamino-pyridine; bis-(4-amino-phenyl)diethylsilane; bis - (4-amino-phenyl) diphenyl silane; bis-(4-amino-phenyl)-N-methylamine; 1,5-diamino-naphthalene; 3,3' - dimethyl - 4,4' - diamino-diphenyl; 3,3'-dimethoxy benzidine; 2,4-bis(beta-amino-t-butyl)toluene; bis-(para-beta-amino-t-butyl-phenyl)ether; para-bis (2-methyl-4-amino-pentyl) benzene; para-bis-(1, 1-dimethyl-5-amino-pentyl) benzene; m-xylene diamine; p-xylene diamine; 3,3'-dichlorobenzidine; bis-(4-amino-phenyl)ethyl phosphine oxide; bis-(4-amino-phenyl)-phosphine oxide; bis-(4-amino-phenyl)-N-phenylamine; p-phenylene - bis - 2(amino - 1,3-benzoxazole); 2,5-bis(p-amino - phenyl) - 1,3,4 - oxadiazole; m-phenylene-bis(m-aminobenzamide); 3,4'-diamino benzanilde and mixtures of the foregoing.

Other polyamines which contain from 3 to 6 amine groups per molecule may also be used. Examples of such suitable polyamines include melamine, tris(4-aminophenyl)methylcarbinol; 3 - methyl - 4,6,4' - triamino-diphenylmethane; 1,2,4-benzenetriamine; 1,3,5-triaminobenzene; 2,4,4'-bis-phenyltriamine; the various triaminodiphenyl ethers; tetraaminodiphenyl ethers; hexaaminodiphenyl ethers, etc., the various triaminodiphenyl sulfides; tetraaminodiphenyl sulfides; pentaaminodiphenyl sulfides, etc., 3,3'-diamino-benzidine; bis(3-methyl-4,6-diaminophenyl)-methane; and the various tri, tetra, penta and hexaaminodiphenyl alkylene compounds wherein the two phenyl groups are bridged by an alkylene of from 1 to 6 carbon atoms, arylene of from 6 to 16 carbon atoms, oxygen, —NH—, carbonyl, sulfur, sulfonyl, phosphorous, phosphonyl and silicon and derivatives thereof.

The preferred polyamines for use in this invention are the diamines. Especially preferred are the diamines set forth above wherein R is an aromatic group containing at least 6 carbon atoms, and characterized by benzenoid unsaturation.

The other coreactants used in the practice of this invention are the ester derivatives of benzophenone tetracarboxylic acids. The isomers of benzophenone tetracarboxylic acid which are preferred for use as the acid moiety of the ester in the present invention are the 3,4,3',4' benzophenone tetracarboxylic acid; 2,3,2',3' benzophenone tetracarboxylic acid; 2,3,3',4' benzophenone tetracarboxylic acid isomers.

The alcohol moieties of the tester are substituted and unsubstituted aliphatic alcohols of from 1 to 8 carbon atoms and aromatic alcohols of from 6 to 10 carbon atoms. Examples of these alcohols include methanol, ethanol, propanol, butanol, diethylene glycol, triethylene glycol, etc.; haloalcohols such as 1,1,1-trifluoropropanol; 2-chloroethanol; 2,2-dichloroethanol; 3 - chloro-1,2 propane diol; 1,4-dibromobutane-2,3-diol; 1-chloro-3-fluoro-2 propanol; phenol, etc. The preferred alcohol moieties are alkyl alcohols of from 1 to 4 carbon atoms. The especially preferred alcohol moiety is ethyl alcohol.

The preferred ester derivatives of benzophenone tetracarboxylic acid for use in the present invention are generally represented by the following structural formula:

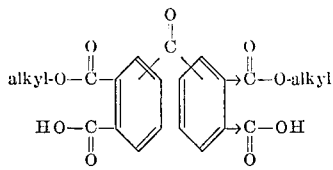

wherein the arrows denote isomerism; wherein the bonds for the carbonyl group

are attached to a carbon atom selected from the two carbon atoms adjacent to the point where the bond is indicated; and wherein the alkyl group contains from 1 to 4 carbon atoms.

The benzophenone tetracarboxylic acid esters used in the present invention are available commercially or can be readily prepared by one skilled in the art according to the procedures set forth in the literature, e.g., Heilbron and Bunbury, "Dictionary of Organic Compounds," Eyre and Spottiswood, London (1953), and other references which are well known to those skilled in the art, or according to the general teaching of Example I.

The proportions of reactants can vary, on a molar basis from about a 50% excess of the benzophenone tetracarboxylic ester compound to a 50% excess of the polyamine. Preferred, however, is a 10% excess of either reactant and especially preferred are chemically equivalent amounts of both types of reactants.

In regard to the percent volatile content, it should be noted that for equivalent amounts of the amine monomeric comopnent and the ester component the numerical value for the percent volatiles due solely to evolution of the alcohol moiety and water of condensation will vary with the weight of the amine component and the weight of the alcohol moiety of the ester component, as is well known to those skilled in the art.

In general, the percent volatile content of the system due to the evolution of the alcohol moiety of the ester and the water of condensation should be at least 9% when using the partial ester derivatives of polycarboxylic acids and at least 16% when using the full ester derivatives. Preferably, one would use systems where the volatile content due to the evolution of the alcohol moiety of the ester and the water of condensation is at least 14% when using the partial ester derivatives of polycarboxylic acids and at least 22% when using the full ester derivatives.

When using the preferred diethyl ester of benzophenone tetracarboxlic acid and the preferred diamines the lower limit volatiles content of the system is preferably at least 14% and more preferably at least 18%.

The upper limit of the volatile content is less critical than the lower limit as is evidenced by the working examples, and will vary widely with the particular system used. In general, the upper limit should not exceed 97% volatiles and preferably, it should not exceed 75%. More preferably, the upper limit of the volatile content should not exceed 55%.

The use of temperatures which are at least 25° C. above the polymerization reaction temperature of the co-reactants is to be preferred. Especially preferred is the use of temperatures which are at least 50° C. above the polymerization reaction temperature of the co-reactants. Most especially preferred is the use of temperatures which are at least 100° C. above the polymerization reaction temperature of the co-reactants. When using the preferred dialkyl esters of tetracarboxylic acids and the preferred diamines under atmospheric conditions and without additives for the facilitation of foam formation, temperatures of at least 250° C. are preferred.

The concept of this invention includes the use of tertiary amines such as pyridine, picoline, quinoline, etc., which will accelerate the forming of the polyimide foam or allow foam formation to occur at lower temperatures. In general up to 10% by weight of these reagents may be used. Vacuum methods, e.g., foaming at subatmospheric pressures are also contemplated as means to accelerate the foaming process or to allow foaming at lower temperatures.

While the reactants set forth in this invention are self-foaming and do not require external foaming means such as mechanical agitation, gas delivery tubes or blowing agents, such means may be useful in controlling cell size and shape and foam texture and density and are included in the concept of this invention. Also contemplated in the preparation of these polyimide foams is the use of nucleating agents, surface active agents, fillers and fibrous reinforcing agents such as glass, asbestos, silica, refrasil, quartz and boron fibers. Metallic fillers such as aluminum microballoons are also useful in changing the physical properties of the polyimide foams.

The interaction of the esters of benzophenone tetracarboxylic acids and polyamines to form polyimide foams may be carried out in trays or vented containers or molds as is illustrated in the working examples. The foams may be formed around reinforcing members by dipping a reinforcing member into a solution or into dry intimate mixtures of monomeric reactants and then heating the systems to form a polymer foam around the reinforcing member. Fluidized bed techniques may be used with hot reinforcing members being dipped into the monomeric reactants. However, these methods should not be construed as limiting. The scope of this invention also contemplates the use of flame-spray techniques to form the foam as well as the use of commercial foaming equipment such as extruders, injection foam molding machines, etc., as is well known to those skilled in the foaming art.

It is obvious that many deviations may be made in the products and processes set forth above without departing from the scope of this invention.

What is claimed is:
1. A process for the preparation of a polyimide foam which is the reaction product of
   (A) at least one ester derivative of a benzophenone tetracarboxylic acid, and
   (B) at least one aromatic polyamine selected from the group consisting of amino compounds containing from 2 to 6 amino groups per molecule;
wherein the ester derivative of the benzophenone tetracarboxylic acid compound is selected from the group consisting of partial and full ester derivatives wherein the alcohol moiety of the ester is selected from the group consisting of substituted and unsubstituted aliphatic alcohols of from 1 to 8 carbon atoms and aromatic alcohols of from 6 to 10 carbon atoms; wherein the process comprises mixing at least one component from (A) and (B) above to form a system having a volatile content of at least 9% and then heating this mixture at a temperature which is at least the minimum temperature at which foaming occurs contemporaneously with the polymerization of the ester derivative of the benzophenone tetracarboxylic acid compound and polyamine components until the polyimide foam is formed.

2. The process of claim 1 wherein the ester derivative of the benzophenone tetracarboxylic acid compound corresponds to the general formula:

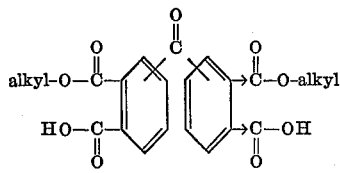

wherein the arrows denote isomerism; wherein the bonds for the carbonyl group

are attached to a carbon atom selected from the two carbon atoms adjacent to the point where the bond is indicated; and wherein the alkyl group contains from 1 to 4 carbon atoms.

3. The process of claim 2 wherein the ester derivatives of the benzophenone tetracarboxylic acid compound is a diethyl ester.

4. The process of claim 3 wherein the polyamine corresponds to the general structural formula:

wherein R is selected from the group consisting of arylene radicals of from 6 to 16 carbon atoms, bisphenylene radicals and bridged phenyl radicals of the general formula

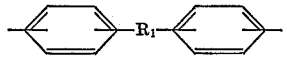

wherein $R_1$ is a divalent linking radical selected from the group consisting of alkylene radicals of from 1 to 6 carbon atoms, arylene radicals of from 6 to 16 carbon atoms, oxygen, —NH—, carbonyl, sulfur, and phosphonyl.

5. The process of claim 3 wherein the polyamine is selected from the group consisting of meta and para-phenylene diamine, 4,4'-oxydianiline, and methylene dianiline.

6. The process of claim 1 wherein the mixing step comprises dissolving the ester component and the polyamine component in a common solvent followed by evaporation of the solvent at temperatures below the minimum reaction temperature of the system to give a molecular dispersion of the reactants.

7. The process of claim 1 wherein the mixing step comprises intimately blending a finely ground solid ester component and a finely ground solid polyamine component.

8. A process for the preparation of a polyimide foam which is the reaction product of:
   (A) at least one ester derivative of benzophenone tetracarboxylic acid, and
   (B) at least one aromatic polyamine selected from the group consisting of amino compound containing from 2 to 6 amino groups per molecule;
wherein the ester derivative of the benzophenone tetracarboxylic acid is selected from the group consisting of partial and full ester derivatives wherein the alcohol moiety of the ester is selected from the group consisting of substituted and unsubstituted aliphatic alcohols of from 1 to 8 carbon atoms and aromatic alcohols of from 6 to 10 carbon atoms; wherein the process comprises mixing at least one component from (A) and (B) above to form a system having a volatile content of at least 9% and then heating this mixture at a temperature which is at least 50° C. above the minimum temperature at which foaming occurs contemporaneously with the polymerization of the ester derivative of the benzophenone tetracarboxylic acid component and polyamine component until the polyimide foam is formed.

9. The process of claim 8 wherein the polyimide foam is prepared by heating an intimate mixture of a diethyl ester derivative of benzophenone tetracarboxylic acid and an aromatic diamine; wherein the mixture has a volatile content of at least 19%, at a temperature of at least 250° C. for at least 3 minutes.

10. The process of claim 9 wherein the aromatic diamine is selected from the group consisting of meta and para-phenylene diamine, 4,4'-oxydianiline, and methylene dianiline.

11. A process for the preparation of a polyimide foam which is the reaction product of
   (A) a diethyl ester of benzophenone tetracarboxylic acid, and
   (B) an aromatic diamine containing two primary amino groups per molecule;
wherein the process comprises mixing the diethyl ester of benzophenone tetracarboxylic acid and the aromatic diamine to form a system having a volatile content of at least 20% and then heating the mixture at a temperature of at least 200° C. until the polyimide foam is formed.

12. The process of claim 11 wherein the aromatic diamine is selected from the group consisting of meta and para-phenylene diamine, 4,4'-oxydianiline, and methylene dianiline.

13. The process of claim 12 wherein the mixture of the ester and amine components has a volatile content in the range of from 20 to 28% volatile and the mixture is heated at a temperature of at least 250° C. for at least 3 minutes.

14. The process of claim 12 wherein the mixture of the ester and amine components has a volatile content in the range of from 20 to 28% volatile and the mixture is heated at a temperature of at least 300° C. for at least 3 mintues.

15. The process of claim 14 wherein the diamine is meta- or para-phenylene diamine.

16. A process for the preparation of a polyimide foam which is the reaction product of
   (A) a diethyl ester of benzophenone tetracarboxylic acid, and
   (B) an aromatic diamine selected from the group consisting of metaphenylene diamine and para-phenylene diamine;
wherein the process comprises mixing the diethyl ester of benzophenone tetracarboxylic acid and the aromatic diamine to form a system having a volatile content of at least 20% and then heating the mixture at a temperature of at least 200° C. until the polyimide foam is formed.

17. The process of claim 16 wherein the mixture of the ester and amine components has a volatile content in the range of from 20 to 28% volatile and the mixture is heated at a temperature of at least 250° C. for at least 3 minutes.

18. The process of claim 16 wherein the mixture of the ester and amine components has a volatile content in the range of from 20 to 28% volatile and the mixture is heated at a temperature of at least 300° C. for at least 3 minutes.

19. The process of claim 16 wherein the diamine is meta-phenylene diamine.

20. The process of claim 16 wherein the diamine is para-phenylene diamine.

21. The process of claim 16 wherein the mixing step comprises dissolving the ester component and the polyamine component in a common solvent followed by evaporation of the solvent at temperatures below the minimum reaction temperature of the system to give a molecular dispersion of the reactants.

References Cited

UNITED STATES PATENTS

| | | | |
|---|---|---|---|
| 2,867,609 | 1/1959 | Edwards et al. | 260—78 |
| 2,944,993 | 7/1960 | Brebner et al. | 260—37 |
| 3,073,784 | 1/1963 | Endrey | 252—518 |
| 3,179,631 | 4/1965 | Endrey | 260—78 |
| 3,249,561 | 5/1966 | Hendrix | 260—2.5N |
| 3,310,506 | 3/1967 | Amborski et al. | 260—2.5N |
| 3,347,808 | 10/1967 | Lavin et al. | 260—78TF |
| 3,349,061 | 10/1967 | Pruckmayr | 260—78TF |

MURRAY TILLMAN, Primary Examiner

M. FOELAK, Assistant Examiner

U.S. Cl. X.R.

260—29.2, 30.4, 32.4, 32.8, 33.4, 37, 47, 65, 78

PO-1050
(5/69)

UNITED STATES PATENT OFFICE
CERTIFICATE OF CORRECTION

Patent No. 3,554,939      Dated January 12, 1971

Inventor(s) Edward Lavin & Irving Serlin

It is certified that error appears in the above-identified patent and that said Letters Patent are hereby corrected as shown below:

Column 6, Table I, line 8, under "300", "Dense compact foam (916)" should read --- Dense compact foam (9.6) ---.

Column 6, lines 74-75 should read --- reactants in the 15 to 25% volatiles range. Volatile content in this system at levels of about 20. and below ---.

Column 10, line 55, "meta-phenyl diamine" should read --- meta-phenylene diamine ---.

Signed and sealed this 13th day of July 1971.

(SEAL)
Attest:

EDWARD M. FLETCHER, JR.
Attesting Officer

WILLIAM E. SCHUYLER, JR.
Commissioner of Patents